US012456615B2

(12) United States Patent
Hager

(10) Patent No.: US 12,456,615 B2
(45) Date of Patent: Oct. 28, 2025

(54) IDENTIFICATION OF HARMONICS IN RF QUADRUPOLE FOURIER TRANSFORM MASS SPECTRA

(71) Applicant: DH Technologies Development Pte. Ltd., Singapore (SG)

(72) Inventor: James W. Hager, Concord (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 438 days.

(21) Appl. No.: 18/019,516

(22) PCT Filed: Aug. 4, 2021

(86) PCT No.: PCT/IB2021/057155
§ 371 (c)(1),
(2) Date: Feb. 3, 2023

(87) PCT Pub. No.: WO2022/029650
PCT Pub. Date: Feb. 10, 2022

(65) Prior Publication Data

US 2023/0290628 A1 Sep. 14, 2023

Related U.S. Application Data

(60) Provisional application No. 63/061,864, filed on Aug. 6, 2020.

(51) Int. Cl.
*H01J 49/36* (2006.01)
*H01J 49/00* (2006.01)
*H01J 49/42* (2006.01)

(52) U.S. Cl.
CPC .......... *H01J 49/36* (2013.01); *H01J 49/0027* (2013.01); *H01J 49/4225* (2013.01)

(58) Field of Classification Search
CPC .... H01J 49/0027; H01J 49/0031; H01J 49/36; H01J 49/4225
See application file for complete search history.

(56) References Cited

U.S. PATENT DOCUMENTS

2020/0090920 A1* 3/2020 Aliman ................ H01J 49/426

FOREIGN PATENT DOCUMENTS

WO WO-2018142265 A1 * 8/2018 ............ H01J 49/427

OTHER PUBLICATIONS

International Search Report and Written Opinion for PCT/IB2021/057155 mailed Jan. 10, 2022.

(Continued)

*Primary Examiner* — David E Smith
(74) *Attorney, Agent, or Firm* — Potomac Law Group, PLLC; Reza Mollaaghababa; Brian Hairston

(57) ABSTRACT

In one aspect, a method for performing mass spectrometry is disclosed, which comprises using a Fourier transform mass analyzer, which extends from an inlet port to an outlet port, to acquire a first mass spectrum of a first plurality of ions generated by ionizing a sample, where the first plurality of ions are radially confined within the mass analyzer under a first radial confinement condition. The method further includes using the Fourier transform mass analyzer to acquire a second mass spectrum of a second plurality of ions generated by ionizing the sample, where the second plurality of ions are radially confined within said mass analyzer using a second radial confinement condition, and comparing said first and second mass spectra to identify spurious mass signals.

20 Claims, 16 Drawing Sheets

(56) References Cited

OTHER PUBLICATIONS

Nagornov Konstantin O et al: "Fourier Transform lon Cyclotron Resonance Mass Spectrometry at the Cyclotron Frequency", Journal of the American Society for Mass Spectrometry, Elsevier Science Inc., US, Feb. 17, 2017, vol. 28, No. 4, pp. 768-780.

* cited by examiner

IDENTIFICATION OF HARMONICS IN RF QUADRUPOLE FOURIER TRANSFORM MASS SPECTRA

RELATED APPLICATION

This application is a 35 U.S.C. 371 national stage filing of International Application No. PCT/IB2021/057155, filed on Aug. 4, 2021, which claims priority to U.S. provisional application No. 63/061,864 filed on Aug. 6, 2020, entitled "Identification of Harmonics in RF Quadrupole Fourier Transform Mass Spectra," which is incorporated herein by reference in its entirety.

BACKGROUND

The present teachings are generally directed to methods and systems for performing Fourier transform (FT) mass spectrometry.

Mass spectroscopy (MS) is an analytical technique for determining the elemental composition of test substances with both quantitative and qualitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during processing.

In some mass spectrometers, a Fourier transform (FT) mass analyzer can be employed. The ions introduced into the FT mass analyzer can be radially confined within the analyzer and can be mass selectively extracted from the analyzer to be detected by a downstream detector. The extracted ions can exhibit oscillations that can be detected by a downstream ion detector so as to generate a time-varying ion detection signal. A Fourier transform of the time-varying ion detection signal can be obtained and utilized to generate a mass spectrum of the ions.

When acquiring data with an (FT) mass analyzer, e.g., a quadrupole FT mass analyzer, high intensity ion signals, especially at lower m/z ratios, can partially obscure the oscillations associated with higher m/z, lower frequency, ions, and hence degrade the signal-to-noise ratio (SNR) of the respective mass spectrum.

Accordingly, methods and systems are needed for FT mass spectroscopy, which can enhance the SNR of mass spectra obtained using FT mass analyzers.

SUMMARY

In one aspect, a method for performing mass spectrometry is disclosed, which comprises using a Fourier transform mass analyzer, which extends from an inlet port to an outlet port, to acquire a first mass spectrum of a first plurality of ions generated by ionizing a sample, where the first plurality of ions are radially confined within the mass analyzer under a first radial confinement condition. The method further includes using the Fourier transform mass analyzer to acquire a second mass spectrum of a second plurality of ions generated by ionizing the sample, where the second plurality of ions are radially confined within said mass analyzer using a second radial confinement condition, and comparing said first and second mass spectra to identify spurious mass signals. In some embodiments, the mass spectra are mass calibrated prior to the comparison step.

The spurious mass signals can correspond to spurious harmonics of mass signals of a subset of at least one of the first and second ions. The spurious mass signals can also result from sum and differences between authentic frequencies, such as $$\omega_{sum}=\omega_1+\omega_2,\text{ and }\omega_{diff}=\omega_1-\omega_2$$

In some embodiments, the spurious mass signals can be removed from at least one of the first and the second mass spectrum so as to generate a corrected mass spectrum.

The mass analyzer can be implemented, for example, as a multipole mass analyzer. By way of example, in some embodiments, such a multipole mass analyzer can include four rods that are arranged relative to one another in a quadrupole configuration providing a passageway between the rods for the ions as they travel from an inlet port of the mass analyzer to an outlet port thereof. In some embodiments, the multipole mass analyzer can include four rods that are arranged in a quadrupole configuration.

The radial confinement conditions can be achieved via application of an RF voltage to at least one rod of the multipole mass analyzer. The radial confinement conditions can be typically varied via adjusting the amplitude of the applied RF voltage, though an adjustment of the frequency of the applied RF voltage (and in some cases, an adjustment of both the voltage and frequency of the applied RF voltage and/or a DC resolving voltage) can also be employed to change the radial confinement conditions associated with the ions within the FT mass analyzer. For example, in some embodiments, a first RF voltage having a first amplitude can be applied to at least one rod of the multipole mass analyzer to achieve the first radial confinement condition and a second RF voltage having a second amplitude different than the first amplitude can be applied to at least one rod of the multipole analyzer to achieve the second radial confinement condition.

In some embodiments, the applied RF voltage can have a peak-to-peak amplitude in a range of about 10 volts to about 1000 volts. In some such embodiments, the RF voltage can have a frequency in a range of about 50 kHz to about 3 MHz. In some embodiments, the variation of the peak-to-peak amplitude of the applied RF voltage between two different radial confinement conditions can be, for example, in a range of about 5 volts to about 50 volts.

The positions of the mass peaks and the spurious harmonic mass signals in two mass spectra obtained under different radial conditions can exhibit different relationships relative to the change in the radial confinement condition. As such, the spurious mass peaks can be identified via a comparison of the mass peaks present in the two mass spectra.

The acquisition of a mass spectrum by the FT mass analyzer can be achieved by introducing a plurality of ions into the mass analyzer, radially confining the ions using a radial confinement condition (e.g., particular values of the peak-to-peak RF voltage and/or RF frequency) followed by radially exciting at least a portion of the ions via an excitation signal to cause radial oscillations of the ions such that the interaction of the radially excited ions with the fringing fields in vicinity of the outlet port of the mass analyzer converts the radial oscillations into axial oscillations. At least a portion of the axially oscillating ions exiting the mass analyzer can be detected to generate mass detection signals and the mass detection signals can be employed to generate a mass spectrum associated with the detected axially oscillating ions.

In a related aspect, a method of performing mass spectrometry is disclosed, which comprises introducing a plurality of ions generated by ionizing a sample into a Fourier transform mass analyzer, radially confining the ions using at least a first radial confinement parameter, applying an ion excitation signal to radially excite at least a portion of the ions to cause the ions to exhibit radial oscillations at secular frequencies thereof, wherein the radially excited ions interact with fringing fields in vicinity of the exit port of the mass analyzer such that the radial oscillations are converted into axial oscillations. At least a portion of the axially oscillating ions exiting the mass analyzer are detected and a mass spectrum associated with the detected ions is generated. The radial confinement parameter can be modified to obtain a second radial confinement parameter. A second plurality of ions generated by ionizing the sample can be introduced into the FT mass analyzer and can be radially confined using the second radial confinement parameter. An ion excitation signal can be applied to the mass analyzer (e.g., to at least one rod of a multipole rod arrangement used to implement the mass analyzer) to excite at least a portion of the second plurality of ions so as to cause the excited ions to radially oscillate at secular frequencies thereof. The radially oscillating ions can interact with the fringing field in the vicinity of the exit port of the mass analyzer. As noted above, such an interaction can convert the radial oscillations of the excited ions into axial oscillations and at least a portion of the axially oscillating ions can be detected to generate mass detection signals and the mass detection signals can be analyzed to generate a mass spectrum of the second plurality of ions. The two mass spectra (i.e., the mass spectrum associated with the first plurality of ions and that associated with the second plurality of ions) can be compared to identify spurious mass signals. In some embodiments, the mass spectra are mass calibrated prior to their comparison.

As noted above, in some embodiments, the spurious mass signals can correspond to spurious harmonics of mass signals associated with at least a subset of at least one of the first or the second plurality of ions. At least a portion (and preferably all of) the identified spurious mass signals can be removed from at least one of the first or the second mass spectrum to generate a corrected mass spectrum (i.e., a mass spectrum that is substantially, and preferably entirely free, of spurious mass signals).

In a related aspect, a method of performing mass spectrometry is disclosed, which comprises generating a plurality of ions exhibiting a distribution of m/z ratios, introducing the ions into a mass filter to remove ions having m/z ratios above or below a threshold m/z ratio, introducing the remaining ions into a Fourier transform (FT) mass analyzer comprising a plurality of rods arranged in a multipole configuration, where the plurality of rods include an input port for receiving ions and an output port through which ions can exit the mass analyzer, applying at least one RF voltage to at least one of the rods so as to generate an RF field for radial confinement of the ions as they pass through the multipole rod set. The method can further include exciting radial oscillations of at least a portion of ions in said FT mass analyzer at secular frequencies thereof such that the fringing fields in proximity of the output end of the plurality of rods can convert the radial oscillations of at least a portion of the radially excited ions into axial oscillations as the excited ions exit the multipole rod set, and detecting at least a portion of the axially oscillating ions exiting the multipole rod set to generate a time-varying signal. A Fourier transform of the time-varying signal can be obtained so as to generate a mass spectrum of the detected ions. The threshold m/z ratio for removing ions can be selected so as to reduce the occurrence of spurious harmonic mass signals in the resultant mass spectrum (via removal of ions contributing to those harmonic mass signals via the upstream filter) or to facilitate the identification of such spurious harmonic mass signals.

In some embodiments, the threshold value of m/z ratio above or below which ions are removed via an upstream mass filter can be, e.g., about 500, though other values can also be employed in other embodiments.

In some embodiments of the above method, the multipole configuration can include a quadrupole configuration in the form of four rods arranged relative to one another to generate a quadrupolar field in response to application of an RF voltage to at least one of the rods.

The radial excitation of the ions to cause their radial oscillations at secular frequencies thereof can be achieved, for example, via application of a voltage pulse across at least two rods of a multipole rod arrangement forming the mass analyzer. In some embodiments, the voltage pulse can have a duration in a range of about 1 microsecond to about 5 microseconds and an amplitude in a range of about 10 volts to about 60 volts.

Further, the RF voltage can have a peak-to-peak amplitude in a range of about 10 volts to about 1000 volts and a frequency in a range of about 50 kHz to about 3 MHz.

In a related aspect, a method of performing mass spectrometry is disclosed, which comprises introducing a plurality of ions generated by ionizing a sample into a Fourier transform mass analyzer comprising a plurality of rods arranged in a multipole configuration, applying at least one RF voltage to at least one of the rods so as to generate an RF field for radial confinement of the ions in the FT mass analyzer, and applying a DC resolving voltage to at least one of the rods so as to remove ions having m/z ratios greater or less than a threshold m/z ratio. The method can further include exciting radial oscillations of at least a portion of the remaining ions in the FT mass analyzer at secular frequencies thereof such that fringing fields in proximity of the output end of said plurality of rods convert said radial oscillations of at least a portion of said excited ions into axial oscillations as said excited ions exit the multipole rod set. At least a portion of the axially oscillating ions exiting the multipole rod set can be detected and analyzed to generate a time-varying ion detection signal. A Fourier transform of the time-varying ion detection signal can be obtained and used to generate a mass spectrum of the detected ions. The DC resolving voltage can be selected so as to reduce the occurrence of spurious mass signals and/or facilitate the identification of such spurious mass signals in a resultant mass spectrum.

By way of example, the resolving DC voltage can be selected to remove ions having m/z ratios greater than, or less than, about 1500.

In some embodiments, the multipole configuration can include a quadrupole configuration, while other configurations can also be employed. As noted above, the excitation of the radial oscillations of the ions can be achieved, for example, via application of a voltage pulse across at least two rods of the multipole rod set. By way of example, the voltage pulse can have an amplitude in a range of about 10 volts to about 60 volts and it can have a duration in a range of about 1 microsecond to about 5 microseconds.

In some embodiments, the RF voltage can have a frequency in a range of about 50 kHz to about 3 MHz. In some such embodiments, the RF voltage can have a peak-to-peak amplitude in a range of about 10 volts to about 1000 volts.

In a related aspect, a method of performing mass spectrometry is disclosed, which comprises introducing a plurality of ions generated by ionizing a sample into a Fourier transform mass analyzer comprising a plurality of rods arranged in a multipole configuration, applying at least one RF voltage to at least one of the rods so as to generate an RF field for radial confinement of the ions in said FT mass analyzer, reducing an amplitude of said at least one RF voltage so as to remove ions having m/z ratios greater or less than a threshold m/z ratio, and exciting radial oscillations of at least a portion of the remaining ions in said FT mass analyzer at secular frequencies thereof such that fringing fields in proximity of the output end of said plurality of rods convert said radial oscillations of at least a portion of said excited ions into axial oscillations as said excited ions exit the multipole rod set. At least a portion of the axially oscillating ions exiting the multipole rod set can be detected to generate a time-varying signal, and a Fourier transform of the time-varying signal can be obtained and utilized in order to generate a mass spectrum of the detected ions. The above threshold can be selected so as to reduce occurrence of spurious harmonic signals or to facilitate detection of the spurious harmonic signals in the mass spectrum. In some embodiments, the threshold can correspond to an m/z ratio of about 500 Th.

In some embodiments, the multipole configuration includes a quadrupole configuration. The step of exciting the radiation oscillations includes applying a voltage pulse across at least two of the rods. In some embodiments, the voltage pulse can have a duration in a range of about 1 microsecond to about 5 microseconds. The voltage pulse can have an amplitude in a range of about 10 volts to about 60 volts.

As noted above, in some embodiments, the RF voltage can have a frequency in a range of about 50 kHz to about 3 MHz. Further, the RF voltage can have a peak-to-peak amplitude in a range of about 10 volts to about 1000 volts.

In a related aspect, a method of performing mass spectrometry is disclosed, which comprises introducing a plurality of ions generated by ionizing a sample into a Fourier transform mass analyzer comprising a plurality of rods arranged in a multipole configuration, applying at least one RF voltage to at least one of the rods so as to generate an RF field for radial confinement of the ions in said FT mass analyzer, wherein the amplitude of the at least one RF voltage is selected so as to ensure that m/z ratios greater than or less than a threshold m/z ratio are not transmitted through the FT mass analyzer, and exciting radial oscillations of at least a portion of the remaining ions in the FT mass analyzer at secular frequencies thereof such that fringing fields in proximity of the output end of said plurality of rods convert said radial oscillations of at least a portion of said excited ions into axial oscillations as said excited ions exit the multipole rod set. At least a portion of the axially oscillating ions exiting the multipole rod set can be detected to generate a time-varying signal, and a Fourier transform of the time-varying signal can be obtained and utilized in order to generate a mass spectrum of the detected ions. The above threshold can be selected so as to reduce occurrence of spurious harmonic signals or to facilitate detection of the spurious harmonic signals in the mass spectrum. By way of example, in some embodiments, the threshold can correspond to an m/z ratio of about 500.

Further understanding of various aspects of the present teachings can be obtained with reference to the following detailed description in conjunction with the associated drawings, which are described briefly below.

DETAILED DESCRIPTION

The present teachings relate to methods and systems for performing Fourier transform (FT) mass spectrometry in which at least two mass spectra obtained under different ion confinement conditions within an FT mass analyzer are acquired and the mass spectra are compared to one another in order to identify spurious mass signals, if any, in one or both of the spectra. Such identification of the spurious mass signals allows correcting at least one of the acquired mass spectra by removing the identified spurious mass signals therefrom.

Various terms are used herein consistent with their ordinary meanings in the art. The term "radial" is used herein to refer to a direction within a plane perpendicular to the axial dimension of the multipole rod set (e.g., along z-direction in FIG. 2A). The terms "radial excitation" and "radial oscillations" refer, respectively, to excitations and oscillations in a radial direction. The term "about" as used herein to modify a numerical value is intended to denote a variation of at most 5 percent about the numerical value.

Figure 1:
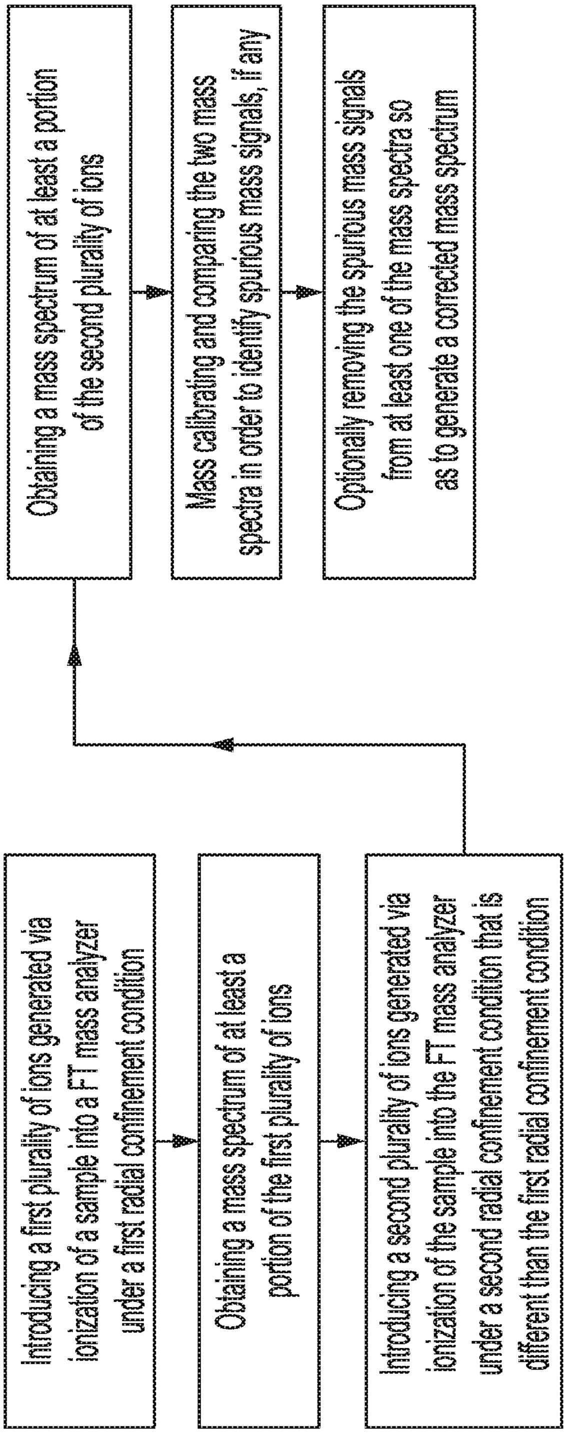
FIG. 1 is a flow chart depicting various steps in an embodiment of a method according to the present teachings for performing Fourier transform mass spectrometry, FIG. 2A schematically depicts a mass analyzer according to an embodiment of the present teachings.

With reference to the flow chart of FIG. 1, in an embodiment of a method according to the present teachings for performing mass spectrometry, a first plurality of ions, generated via ionization of a sample, are introduced into a Fourier transform mass analyzer via an inlet port thereof (step 1). The ions are radially confined within the FT mass analyzer under a first radial confinement condition. A mass spectrum of at least a portion of the first plurality of ions is obtained (step 2). A second plurality of ions are introduced into the mass analyzer and are radially confined within the mass analyzer under a second radial confinement condition different than the first radial confinement condition (step 3). By way of example, the change in the radial confinement conditions can be achieved by adjusting an RF voltage and/or a DC resolving voltage applied to a multipole rod set utilized to implement the FT mass analyzer. The mass spectra obtained under the different radial confinement conditions can be mass calibrated and compared with one another to identify the spurious mass signals (step 4). The identified spurious mass signals can be removed, e.g., via software, from at least one of the mass spectra so as to obtain a corrected mass spectrum, i.e., a mass spectrum that is substantially free of the spurious mass signals.

Figure 2A:
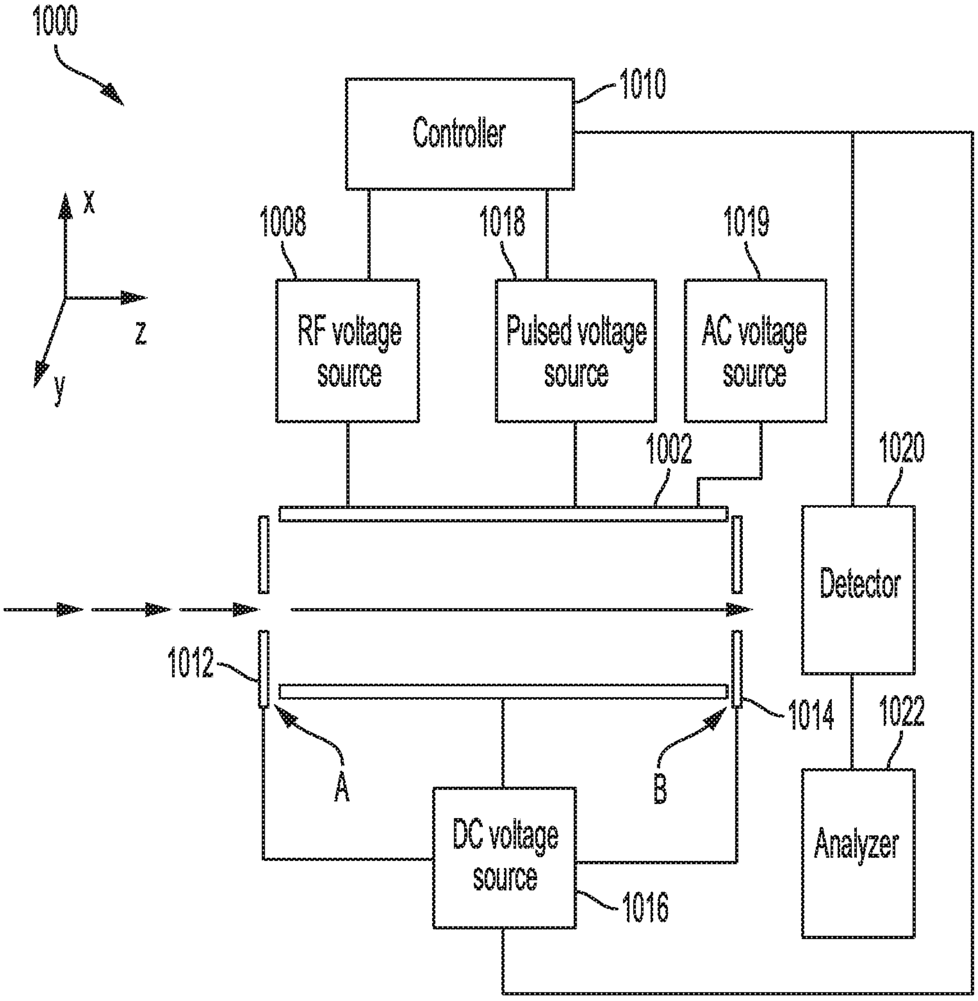
FIG. 2B is a schematic end view of a set of quadrupole rods of the mass analyzer depicted in FIG. 2A, FIG. 3 schematically depicts a square voltage pulse suitable for use in some embodiments of a mass analyzer according to the present teachings, FIG. 4A schematically depicts an example of an analysis module suitable for use in a mass spectrometer according to the present teachings, FIG. 4B schematically depicts that in some embodiments a mass filter can be positioned upstream of the FT mass analyzer for reducing, or eliminating, passage of ions that are likely to contribute to spurious mass signals to the FT mass analyzer.
Figure 2B:
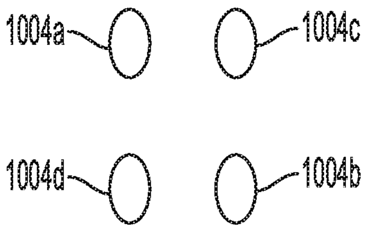

FIGS. 2A and 2B schematically depict a mass analyzer 1000 according to an embodiment of the present teachings, which includes a quadrupole rod set 1002 that extends from an input end (A) (herein also referred to as an inlet port) that is configured for receiving ions to an output end (B) (herein also referred to as outlet port) through which ions can exit the quadrupole rod set. In this embodiment, the quadrupole rod set includes four rods 1004*a*, 1004*b*, 1004*c*, and 1004*d* (herein collectively referred to as quadrupole rods 1004), which are arranged relative to one another to provide a passageway therebetween through which ions received by the quadrupole rod set can propagate from the input end (A) to the output end (B). In this embodiment, the quadrupole rods 1004 have a circular cross-section while in other embodiments they can have a different cross-sectional shape, such as hyperbolic.

The mass analyzer 1000 can receive ions, e.g., a continuous stream of ions, generated by an ion source (not shown in this figure). A variety of different types of ions sources can be employed. Some suitable examples include, without limitation, an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ions source, DESI, among others.

The application of radiofrequency (RF) voltages to the quadrupole rods 1004 can provide a quadrupolar field for radial confinement of ions as they pass through the quadrupole. The RF voltages can be applied to the rods with or without a selectable amount of a resolving DC voltage applied concurrently to one or more of the quadrupole rods.

In some embodiments, the RF voltages applied to the quadrupole rods 1004 can have a frequency in a range of about 0.8 MHz to about 3 MHz and an amplitude in a range of about 100 volts to about 1500 volts, though other frequencies and amplitudes can also be employed. In this embodiment, and RF voltage source 1008 operating under the control of a controller 1010 provides the required RF voltages to the quadrupole rods 1004.

As discussed in more detail below, the controller 1010 can adjust the amplitude and/or the frequency of the RF voltage and/or the DC resolving voltage applied to at least one of the quadrupole rods so as to modify the radial confinement conditions to which the ions within the FT mass analyzer are exposed. Such change in the radial confinement of the ions affect the positions of the actual mass peaks (herein also referred to as actual or analyte mass signals) and any spurious mass peaks (herein also referred to as spurious mass signals) in the resultant mass spectra differently. This can in turn allow the identification of the spurious mass peaks and their removal in order to arrive at corrected mass spectra.

More particularly, a common way of determining m/z values of ions in an FT mass spectrometer is to measure the secular frequencies of the ions, determine the Mathieu β parameters, obtain the Mathieu q-parameters (and a-values, if needed, e.g., when a DC resolving voltage is applied), and finally utilize the q-parameters to calculate the m/z values. The relationships between the secular frequency, m/z value, and the Mathieu β and q parameters (for a=0) are provided below:

$$\omega = \frac{\beta\Omega}{2} \qquad \text{Eq. (1)}$$

$$\beta^2 = a + \cfrac{q^2}{(\beta+2)^2 - a - \cfrac{q^2}{(\beta+4)^2 - a - \cfrac{q^2}{(\beta+6)^2 - a - \dots}}} + \cfrac{q^2}{(\beta-2)^2 - a - \cfrac{q^2}{(\beta-4)^2 - a - \cfrac{q^2}{(\beta-6)^2 - a - \dots}}} \qquad \text{Eq. (2)}$$

$$m/z = \frac{4eV_{RF}}{q\Omega^2 r_0^2} \qquad \text{Eq. (3)}$$

The above relations show that ω (an ion's secular frequency) is linearly related to β, but not to q. This means that the positions (in m/z space) of analyte mass signals (based on their fundamental secular frequencies) and spurious higher harmonics of the analyte mass signals will not have the same relationship relative to radial confinement conditions. By way of example, the peak-to-peak RF amplitude applied to at least one of the rods of the quadrupole rod set of the FT mass analyzer can be adjusted to achieve different strengths for the radial confinement of the ions, which can in turn affect the positions of the analyte mass signals and the spurious harmonics of the mass signals differently. Thus, m/z peaks due to higher harmonics can be differentiated from the m/z analyte peaks by comparing mass calibrated mass spectra acquired under at least two different radial confinement conditions, e.g., two different amplitudes of the applied RF voltage, to identify the spurious mass signals, e.g., the spurious mass signals due to higher harmonics of the analyte mass signals, as discussed further below.

Under each of the radial confinement conditions, the ions can be radially excited via application of a voltage pulse across at least two rods of the FT mass analyzer so as to cause radial oscillations of the ions. As discussed in more detail below, the interaction of the radially excited ions with the fringing fields in the vicinity of the distal end of the FT mass analyzer can convert the radial oscillations of the ions into axial oscillations. The axially oscillating ions can exit the FT mass analyzer to be detected by a downstream detector, and the mass signals generated by the detector can be analyzed to derive a mass spectrum of the detected ions.

More specifically, the quadrupolar field generated via application of RF voltage(s) to the rods can exhibit fringing fields in the vicinity of the outlet port of the quadrupole rod set, which can be utilized to obtain mass selective extraction of ions from the FT mass analyzer, via application of a voltage pulse across at least two of the rods for causing radial ion excitations, as discussed in more detail below.

With continued reference to FIGS. 2A and 2B, in this embodiment, the mass analyzer 1000 further includes an input lens 1012 disposed in proximity of the input end of the quadrupole rod set and an output lens 1014 disposed in proximity of the output end of the quadrupole rod set. A DC voltage source 1016, operating under the control of the controller 1010, can apply two DC voltages, e.g., in range of about 1 to 50 V attractive relative to the DC offset of the quadrupole, to the input lens 1012 and the output lens 1014. In some embodiments, the DC voltage applied to the input lens 1012 causes the generation of an electric field that facilitates the entry of the ions into the mass analyzer. Further, the application of a DC voltage to the output lens 1014 can facilitate the exit of the ions from the quadrupole rod set.

The lenses 1012 and 1014 can be implemented in a variety of different ways. For example, in some embodiments, the lenses 1012 and 1014 can be in the form of a plate having an opening through which the ions can pass. In other embodiments, at least one (or both) of the lenses 1012 and 1014 can be implemented as a mesh. There can also be RF-only Brubaker lenses at the entrance and exit ends of the quadrupole.

As discussed in more detail below, the application of a voltage pulse across at least two of the quadrupole rods can excite the radial oscillations of the ions within the FT mass analyzer. The radially oscillating ions can interact with the fringing fields in the vicinity of the outlet port of the FT mass analyzer such that the radial oscillations are converted into axial oscillations. The axially oscillating ions can exit the FT mass analyzer and can be detected by a downstream detector 1020.

By way of further illustration and without being limited to any particular theory, the application of the RF voltage(s) to the quadrupole rods can result in the generation of a two-dimensional quadrupole potential as defined in the following relation:

$$\varphi_{2D} = \varphi_0 \frac{x^2 - y^2}{r_0^2} \qquad \text{Eq. (4)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole may be characterized by the diminution of the two-dimensional quadrupole potential in the vicinity of the input and the output ends of the quadrupole by a function $f(z)$ as indicated below:

$$\varphi_{FF} = \varphi_{2D} f(x) \qquad \text{Eq. (5)}$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to the diminution of the two-dimensional quadrupole field can be described as follow:

$$E_{z,qud} = -\varphi_{2D} \frac{\partial f(z)}{\partial z} \qquad \text{Eq. (6)}$$

As discussed in more detail below, such a fringing field allows converting radial oscillations of ions excited via application of a voltage pulse to one or more of the quadrupole rods (and/or one or more auxiliary electrodes) to axial oscillations, where the axially oscillating ions are detected by a detector.

With continued reference to FIGS. 2A and 2B, the analyzer 1000 further includes a pulsed voltage source 1018 for applying a pulsed voltage across at least two of the quadrupole rods 1004. In this embodiment, the pulsed voltage source 1018 applies a dipolar pulsed voltage to the rods 1004*a* and 1004*b*, though in other embodiments, the dipolar pulsed voltage can be applied to the rods 1004*c* and 1004*d*.

In some embodiments, the amplitude of the applied pulsed voltage can be, for example, in a range of about 10 volts to about 60 volts, or in a range of about 20 volts to about 30 volts, though other amplitudes can also be used. Further, the duration of the pulsed voltage (pulse width) can be, for example, in a range of about 10 nanoseconds (ns) to about 1 millisecond, e.g., in a range of about 1 microsecond to about 100 microseconds, or in a range of about 5 microseconds to about 50 microseconds, or in a range of about 10 microseconds to about 40 microseconds, though other pulse durations can also be used. In general, a variety of pulse amplitudes and durations can be employed. In many embodiments, the longer is the pulse width, the smaller is the pulse amplitude. Ions passing through the quadrupole are normally exposed to only a single excitation pulse. Once the "slug" of excited ions pass through the quadrupole, an additional excitation pulse is triggered. This normally occurs every 1 to 2 ms, so that about 500 to 1000 data acquisition periods are collected each second.

Figure 3:
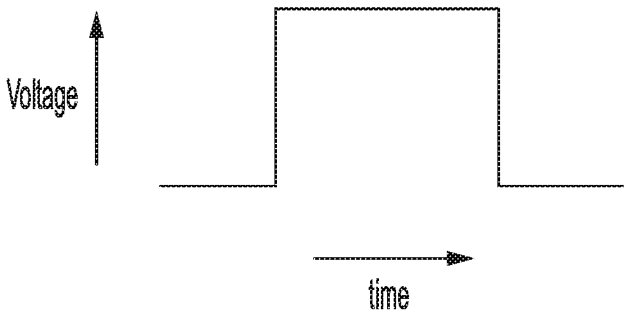

The waveform associated with the voltage pulse can have a variety of different shapes with the goal of providing a rapid broadband excitation signal. By way of example, FIG. 3 schematically shows an exemplary voltage pulse having a square temporal shape. In some embodiments, the rise time of the voltage pulse, i.e., the time duration that it takes for the voltage pulse to increase from zero volt to reach its maximum value, can be, for example, in a range of about 1 to 100 nsec. In other embodiments, the voltage pulse can have a different temporal shape.

Without being limited to any particular theory, the application of the voltage pulse, e.g., across two diagonally opposed quadrupole rods, generates a transient electric field within the quadrupole. The exposure of the ions within the quadrupole to this transient electric field can radially excite at least some of those ions at their secular frequencies. Such excitation can encompass ions having different mass-tocharge (m/z) ratios. In other words, the use of an excitation voltage pulse having a short temporal duration can provide a broadband radial excitation of the ions within the quadrupole.

As the radially excited ions reach the end portion of the quadrupole rod set in the vicinity of the output end (B), they will interact with the exit fringing fields. Again, without being limited to any particular theory, such an interaction can convert the radial oscillations of at least a portion of the excited ions into axial oscillations.

The axially oscillating ions leave the quadrupole rod set and the exit lens 1014 to reach a detector 1020, which operates under the control of the controller 1010. The detector 1020 generates a time-varying ion signal in response to the detection of the axially oscillating ions. A variety of detectors can be employed. Some examples of suitable detectors include, without limitation, are Photonics Channeltron Model 4822C and ETP electron multiplier Model AF610.

An analyzer 1022 (herein also referred to as an analysis module) in communication with the detector 1020 can receive the detected time-varying signal and operate on that signal to generate a mass spectrum associated with the detected ions. More specifically, in this embodiment, the analyzer 1022 can obtain a Fourier transform of the detected time-varying signal to generate a frequency-domain signal. The analyzer can then convert the frequency domain signal into a mass spectrum using the relationships between the Mathieu a- and q-parameters and m/z.

$$a_x = -a_y = \frac{8zU}{\Omega^2 r_0^2 m} \quad \text{Eq. (7)}$$

$$q_x = -q_y = \frac{4zV}{\Omega^2 r_0^2 m} \quad \text{Eq. (8)}$$

where z is the charge on the ion, U is the DC voltage on the rods, V is the RF voltage amplitude, Ω is the angular frequency of the RF, and $r_0$ is the characteristic dimension of the quadrupole. The radial coordinate r is given by $$r^2 = x^2 + y^2 \quad \text{Eq. (9)}$$

In addition, when q<~0.4 the parameter β is given by the following relations:

$$\beta^2 = a + \frac{q^2}{2} \quad \text{Eq. (10)}$$

and the fundamental secular frequency is given by $$\omega = \frac{\beta\Omega}{2} \quad \text{Eq. (11)}$$

Under the condition where a=0 and q<~0.4, the secular frequency is related to m/z by the approximate relationship below.

$$\frac{m}{2} \sim \frac{2}{\sqrt{2}} \frac{V}{\omega\Omega r_0^2} \quad \text{Eq. (12)}$$

As indicated above, the exact value of β is a continuing fraction expression in terms of the a- and q-Mathieu parameters. This continuing fraction expression is provided above and can also be found in the reference J. Mass Spectrom. Vol 32, 351-369 (1997), which is herein incorporated by reference in its entirety.

The relationship between m/z and secular frequency can alternatively be determined through fitting a set of frequencies to the equation $$\frac{m}{Z} = \frac{A}{\omega} + B \quad \text{Eq. (13)}$$

where, A and B are constants to be determined.

In some embodiments, a mass analyzer according to the present teachings can be employed to generate mass spectra with a resolution that depends on the length of the time varying excited ion signal, but the resolution can be typically in a range of about 100 to about 1000.

Figure 4A:
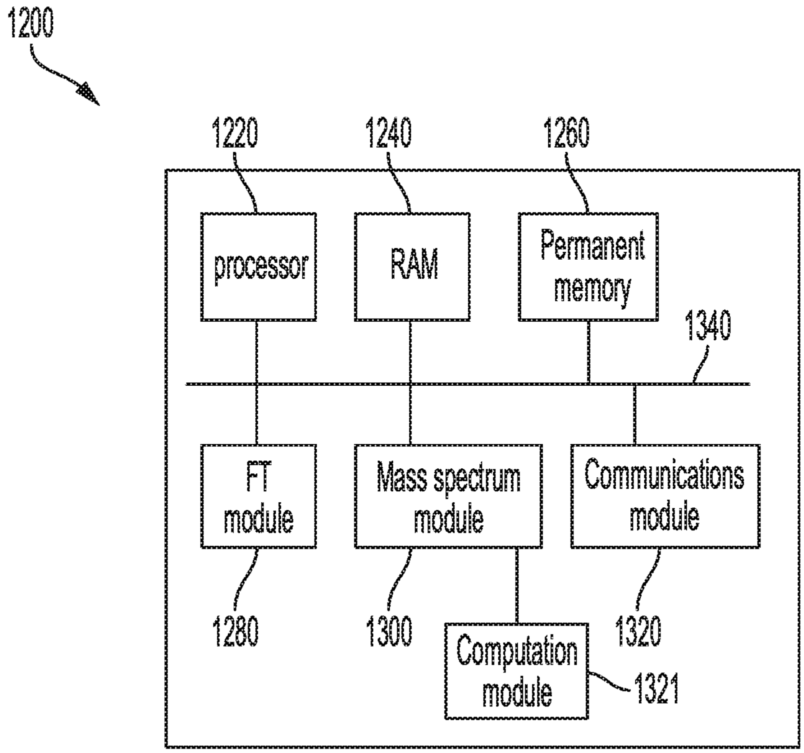

The analyzer 1022 can be implemented in hardware and/or software in a variety of different ways. By way of example, FIG. 4A schematically depicts an embodiment of the analyzer 1200, which includes a processor 1220 for controlling the operation of the analyzer. The exemplary analyzer 1200 further includes a random-access memory (RAM) 1240 and a permanent memory 1260 for storing instructions and data. The analyzer 1200 also includes a Fourier transform (FT) module 1280 for operating on the time-varying ion signal received from the detector 1180 (e.g., via Fourier transform) to generate a frequency domain signal, and a module 1300 for calculating the mass spectrum of the detected ions based on the frequency domain signal. A communications module 1320 allows the analyzer to communicate with the detector 1180, e.g., to receive the detected ion signal. A communications bus 1340 allows various components of the analyzer to communicate with one another.

In this embodiment, the analyzer 1022 further includes a comparison module 1321, which receives the mass spectra obtained under different radial confinement conditions from the mass spectrum module 1300. The comparison module 1321 can mass calibrate the received mass spectra acquired under different radial conditions and can compare the mass-calibrated spectra in order to identify the spurious harmonic mass signals. The instructions for comparison of the mass spectra can be stored in the analyzer's permanent memory and can be transferred into RAM during runtime to be executed.

Figure 6:
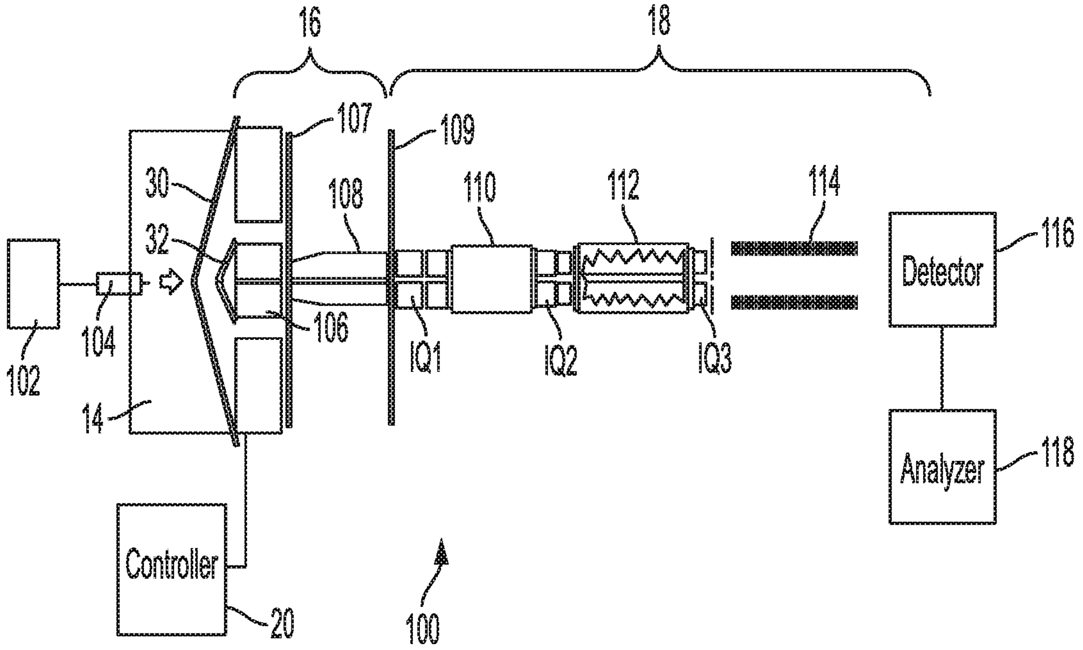
FIG. 6 is a schematic view of a mass spectrometer in which a mass analyzer according to the present teachings is incorporated.

More specifically, in this embodiment, analyzer 1022 can receive ion detection signals via communicating with an ion detector (such as the ion detector 116 depicted in FIG. 6). The mass spectrum module 1300 of the analyzer can operate on the received ion detection signals, in a manner discussed herein, to generate two mass spectra corresponding to two different radial confinement conditions.

For each mass spectrum, the comparison module 1321 can receive the mass spectra (i.e., the data corresponding to the mass spectra) and can mass calibrate the two mass spectra, e.g., using the above relationships. In one method of calibrating the mass spectra, a plurality of secular frequencies of a calibrant ion for a plurality of applied RF voltages ($V_{RF}$) is measured, and Mathieu β and q parameters for each of the measured secular frequencies are calculated, and RF voltage amplitude ($V_{RF}$) for each calculated q parameter is determined. For each calculated q parameter, an offset RF voltage amplitude ($\Delta V_{RF}$) corresponding to a deviation of the applied $V_{RF}$ and the calculated $V_{RF}$ is determined so as to generate a $\Delta V_{RF}$ v.s. q calibration curve.

The comparison module 1321 can employ known techniques for identifying mass peaks in the mass spectra, including known peak picking routines in the mass spectra to identify the mass peaks. For each mass peak in each spectrum, the comparison module 1321 assigns that mass peak as an analyte mass peak if it overlaps in m/z space with a respective mass in the other spectrum and identifies the other mass peaks (i.e., those that do not exhibit overlap in m/z space with a respective mass peak in the other spectrum) as spurious mass signals. In other words, those mass peaks that overlap in the m/z space (i.e., those mass peaks that remain unshifted in m/z space between the two spectra) can be assigned to analytes and those mass peaks that exhibit displacement in the m/z space between the two mass spectra can be identified as spurious mass signals due to higher harmonics.

As discussed above, in some embodiments, an upstream mass filter can be employed to reduce, or eliminate, the passage of certain ions that are likely to contribute to spurious mass signals to the downstream FT mass analyzer.

Figure 4B:
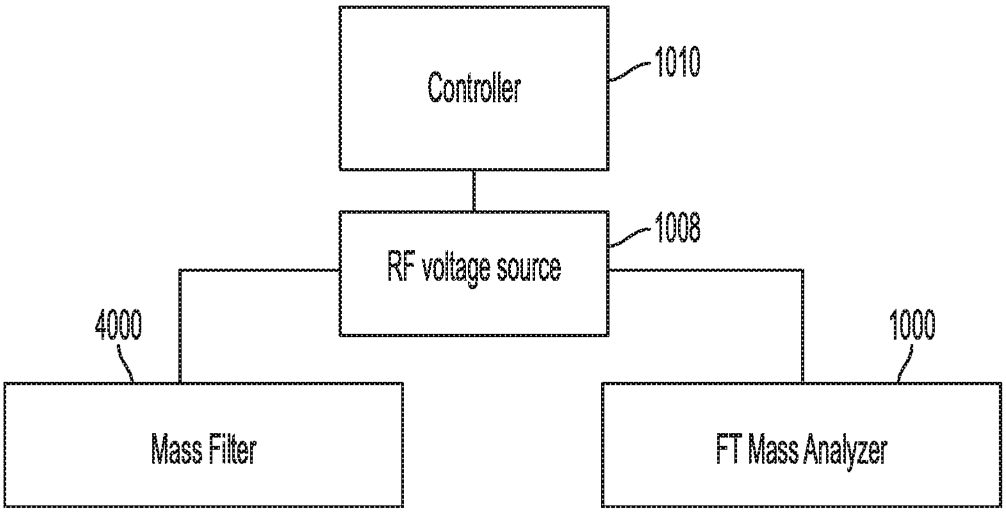

By way of example, with reference to FIG. 4B, in one such embodiment, a mass filter 4000 that is positioned upstream of the FT mass analyzer 1000 can be employed to reduce, or eliminate, the passage of certain ions that can contribute to spurious mass signals to the FT mass analyzer. The mass filter can be implemented as a multipole rod set, and an RF voltage can be applied to at least one rod of the multipole rod set via the RF voltage source 1008, which operates under the control of the controller 1010, so as to provide stable trajectories for certain ions as they pass through the mass analyzer while ensuring that certain other ions that may contribute to spurious mass signals will experience unstable trajectories and hence their passage through the mass filter will be inhibited. For example, the controller 1010 can set the amplitude of the RF voltage applied to the mass filter 4000 to ensure that ions having m/z ratios less than or greater than a threshold will be inhibited from passage through the mass filter. By way of example, the threshold value can be selected to correspond to an m/z ratio of about 500, although other threshold values can be selected as well. The removal of such interfering ions can advantageously simplify the resultant mass spectrum for analysis, as shown in the examples below.

Referring again to FIG. 4A, in another embodiment, the amplitude of the RF voltage applied to the FT mass analyzer can be selected so as to inhibit passage of selected ions through the mass analyzer. For example, in some such embodiments, the controller 1010 can set the amplitude of the RF voltage applied to the FT mass analyzer so as to remove high m/z, i.e., low frequency, ions. By way of example, the $V_{RF}$ applied to at least one rod of the FT mass analyzer can be less than about 100 V so as to inhibit passage of ions having m/z ratios above 500.

Figure 5A:
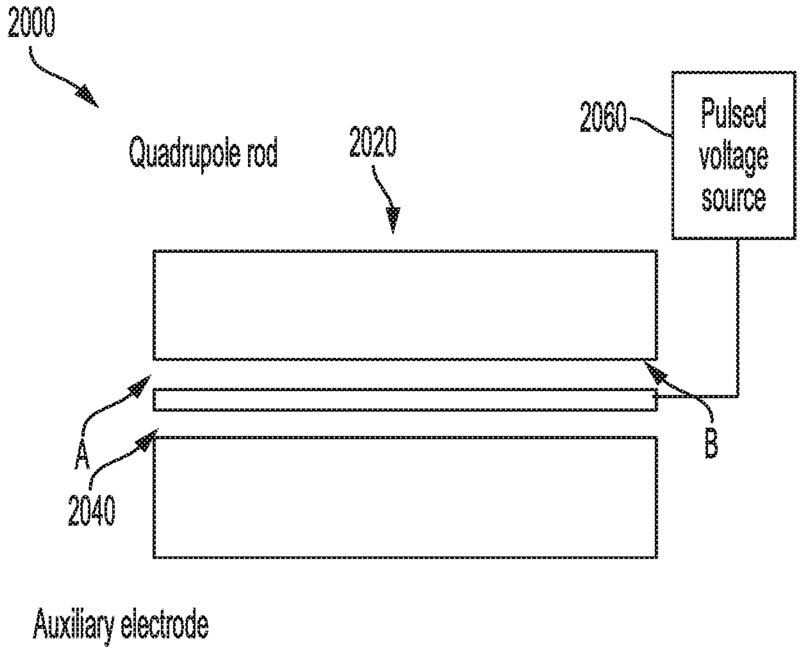
FIG. 5A is a side schematic view of a mass analyzer according to an embodiment, where the analyzer incudes four quadrupole rods and four auxiliary electrodes.
Figure 5B:
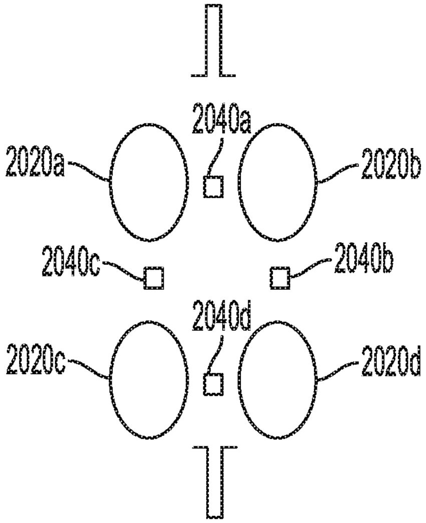
FIG. 5B is an end view of the mass analyzer depicted in FIG. 4A.

In some embodiments, a mass analyzer according to the present teachings can include a quadrupole rod set as well as one or more auxiliary electrodes to which a voltage pulse can be applied for radial excitation of the ions within the quadrupole. By way of example, FIGS. 5A and 5B schematically depict a mass analyzer 2000 according to such an embodiment, which includes a quadrupole rod set 2020 composed of four rods 2020*a*, 2020*b*, 2020*c*, and 2020*d* (herein collectively referred to as quadrupole rods 2020). In this embodiment, the analyzer 2000 further includes a plurality of auxiliary electrodes 2040*a*, 2040*b*, 2040*c* and 2040*d* (herein collectively referred to as auxiliary electrodes 2040), which are interspersed between the quadrupole rods 2020. Similar to the quadrupole rods 2020, the auxiliary electrodes 2040 extend from an input end (A) of the quadrupole to an output end (B) thereof. In this embodiment, the auxiliary electrodes 2040 have substantially similar lengths as the quadrupole rods 2020, though in other embodiments they can have different lengths.

Similar to the previous embodiment, RF voltages can be applied to the quadrupole rods 2020, e.g., via an RF voltage source (not shown) for radial confinement of the ions passing therethrough. Rather than applying a voltage pulse to one or more of the quadrupole rods, in this embodiment, a voltage pulse can be applied to one or more of the auxiliary electrodes to cause radial excitation of at least some of the ions passing through the quadrupole. By way of example, in this embodiment, a pulsed voltage source 2060 can apply a dipolar voltage pulse to the rods 2040*a* and 2040*d* (e.g., a positive voltage to the rod 2040*a* and a negative voltage to the rod 2040*d*).

Similar to the previous embodiment, the voltage pulse can cause radial excitation of at least some of the ions passing through the quadrupole. As discussed above, the interaction of the radially excited ions with the fringing fields in proximity of the output end of the quadrupole can convert the radial oscillations to axial oscillations, and at least a portion of the axially oscillating ions can be detected by a detector (not shown in this figure). Similar to the previous embodiment, an analyzer, such as the analyzer 1200 discussed above, can operate on a time-varying ion signal generated as a result of the detection of the axially oscillating ions to generate a frequency domain signal and can operate on the frequency domain signal to generate a mass spectrum of the detected ions.

A mass analyzer according to the present teachings can be incorporated in a variety of different mass spectrometers. By way of example, FIG. 6 schematically depicts such a mass spectrometer 100, which comprises an ion source 104 for generating ions within an ionization chamber 14, an upstream section 16 for initial processing of ions received therefrom, and a downstream section 18 containing one or more mass analyzers, collision cell and a mass analyzer 116 according to the present teachings.

Ions generated by the ion source 104 can be successively transmitted through the elements of the upstream section 16 (e.g., curtain plate 30, orifice plate 32, QJet 106, and Q0 108) to result in a narrow and highly focused ion beam (e.g., in the z-direction along the central longitudinal axis) for further mass analysis within the high vacuum downstream portion 18. In the depicted embodiment, the ionization chamber 14 can be maintained at an atmospheric pressure, though in some embodiments, the ionization chamber 14 can be evacuated to a pressure lower than atmospheric pressure. The curtain chamber (i.e., the space between curtain plate 30 and orifice plate 32) can also be maintained at an elevated pressure (e.g., about atmospheric pressure, a pressure greater than the upstream section 16), while the upstream section 16, and downstream section 18 can be maintained at one or more selected pressures (e.g., the same or different sub-atmospheric pressures, a pressure lower than the ionization chamber) by evacuation through one or more vacuum pump ports (not shown). The upstream section 16 of the mass spectrometer system 100 is typically maintained at one or more elevated pressures relative to the various pressure regions of the downstream section 18, which typically operate at reduced pressures so as to promote tight focusing and control of ion movement.

The ionization chamber 14, within which analytes contained within the fluid sample discharged from the ion source 104 can be ionized, is separated from a gas curtain chamber by a curtain plate 30 defining a curtain plate aperture in fluid communication with the upstream section via the sampling orifice of an orifice plate 32. In accordance with various aspects of the present teachings, a curtain gas supply can provide a curtain gas flow (e.g., of $N_2$) between the curtain plate 30 and orifice plate 32 to aid in keeping the downstream section of the mass spectrometer system clean by declustering and evacuating large neutral particles. By way of example, a portion of the curtain gas can flow out of the curtain plate aperture into the ionization chamber 14, thereby preventing the entry of droplets through the curtain plate aperture.

As discussed in detail below, the mass spectrometer system 100 also includes a power supply and controller (not shown) that can be coupled to the various components so as to operate the mass spectrometer system 100 in accordance with various aspects of the present teachings.

As shown, the depicted system 100 includes a sample source 102 configured to provide a fluid sample to the ion source 104. The sample source 102 can be any suitable sample inlet system known to one of skill in the art and can be configured to contain and/or introduce a sample (e.g., a liquid sample containing or suspected of containing an analyte of interest) to the ion source 104. The sample source 102 can be fluidly coupled to the ion source so as to transmit a liquid sample to the ion source 102 (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting examples. In some aspects, the sample source 102 can comprise an infusion pump (e.g., a syringe or LC pump) for continuously flowing a liquid carrier to the ion source 104, while a plug of sample can be intermittently injected into the liquid carrier.

The ion source 104 can have a variety of configurations but is generally configured to generate ions from analytes contained within a sample (e.g., a fluid sample that is received from the sample source 102). In this embodiment, the ion source 104 comprises an electrospray electrode, which can comprise a capillary fluidly coupled to the sample source 102 and which terminates in an outlet end that at least partially extends into the ionization chamber 14 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture. As is known in the art, analytes contained within the micro-droplets can be ionized (i.e., charged) by the ion source 104, for example, as the sample plume is generated. In some aspects, the outlet end of the electrospray electrode can be made of a conductive material and electrically coupled to a power supply (e.g., voltage source) operatively coupled to the controller 20 such that as fluid within the micro-droplets contained within the sample plume evaporate during desolvation in the ionization chamber 12, bare charged analyte ions or solvated ions are released and drawn toward and through the curtain plate aperture. In some alternative aspects, the discharge end of the sprayer can be non-conductive and spray charging can occur through a conductive union or junction to apply high voltage to the liquid stream (e.g., upstream of the capillary). Though the ion source 104 is generally described herein as an electrospray electrode, it should be appreciated that any number of different ionization techniques known in the art for ionizing analytes within a sample and modified in accordance with the present teachings can be utilized as the ion source 104. By way of non-limiting example, the ion source 104 can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others. It will be appreciated that the ion source 102 can be disposed orthogonally relative to the curtain plate aperture and the ion path axis such that the plume discharged from the ion source 104 is also generally directed across the face of the curtain plate aperture such that liquid droplets and/or large neutral molecules that are not drawn into the curtain chamber can be removed from the ionization chamber 14 so as to prevent accumulation and/or recirculation of the potential contaminants within the ionization chamber. In various aspects, a nebulizer gas can also be provided (e.g., about the discharge end of the ion source 102) to prevent the accumulation of droplets on the sprayer tip and/or direct the sample plume in the direction of the curtain plate aperture.

In some embodiments, upon passing through the orifice plate 32, the ions can traverse one or more additional vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18. In accordance with various aspects of the present teachings, it will also be appreciated that the exemplary ion guides described herein can be disposed in a variety of front-end locations of mass spectrometer systems. By way of non-limiting example, the ion guide 108 can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between a QJet® ion guide and Q0 (e.g., operated at a pressure in the 100s of mTorrs, at a pressure between a typical QJet® ion guide and a typical Q0 focusing ion guide).

As shown, the upstream section 16 of system 100 is separated from the curtain chamber via orifice plate 32 and generally comprises a first RF ion guide 106 (e.g., QJet® of SCIEX) and a second RF guide 108 (e.g., Q0). In some exemplary aspects, the first RF ion guide 106 can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure. The QJet 106 transfers ions received thereby to subsequent ion optics such as the Q0 RF ion guide 108 through the ion lens IQ0 107 disposed therebetween. The Q0 RF ion guide 108 transports ions through an intermediate pressure region (e.g., in a range of about 1 mTorr to about 10 mTorr) and delivers ions through the IQ1 lens 109 to the downstream section 18 of system 100.

The downstream section 18 of system 100 generally comprises a high vacuum chamber containing the one or more mass analyzers for further processing of the ions transmitted from the upstream section 16. As shown in FIG. 5, the exemplary downstream section 18 includes a mass analyzer 110 (e.g., elongated rod set Q1) and a second elongated rod set 112 (e.g., q2) that can be operated as a collision cell. The downstream section further includes a mass analyzer 114 according to the present teachings.

Mass analyzer 110 and collision cell 112 are separated by orifice plates IQ2, and collision cell 112 and the mass analyzer 114 are separated by orifice plate IQ3. For example, after being transmitted from 108 Q0 through the exit aperture of the lens 109 IQ1, ions can enter the adjacent quadrupole rod set 110 (Q1), which can be situated in a vacuum chamber that can be evacuated to a pressure that can be maintained at a value lower than that of chamber in which RF ion guide 107 is disposed.

By way of non-limiting example, the vacuum chamber containing Q1 can be maintained at a pressure less than about $1\times11^{-4}$ Torr (e.g., about $5\times10^{-5}$ Torr), though other pressures can be used for this or for other purposes. As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1.

Ions passing through the quadrupole rod set Q1 can pass through the lens IQ2 and into the adjacent quadrupole rod set q2, which can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam.

In this embodiment, the ions exiting the collision cell 112 can be received by the mass analyzer 114 according to the present teachings. As discussed above, the mass analyzer 114 can be implemented as a quadrupole mass analyzer with or without auxiliary electrodes. The application of RF voltages to the quadrupole rods (with or without a selectable resolving DC voltage) can provide radial confinement of the ions as they pass through the quadrupole and the application of a DC voltage pulse to one or more of the RF rods or the auxiliary electrodes can cause radial excitation of at least a portion (and preferably all) of the ions. As discussed above, the interaction of the radially excited ions with the fringing fields as they exit the quadrupole can convert the radial excitation of at least some of the ions into axial excitation. The ions are then detected by a detector 118, which generates a time-varying ion signal. An analyzer 120 in communication with the detector 118 can operate on the time-varying ion signal to derive a mass spectrum of the detected ions in a manner discussed above.

Figure 13:
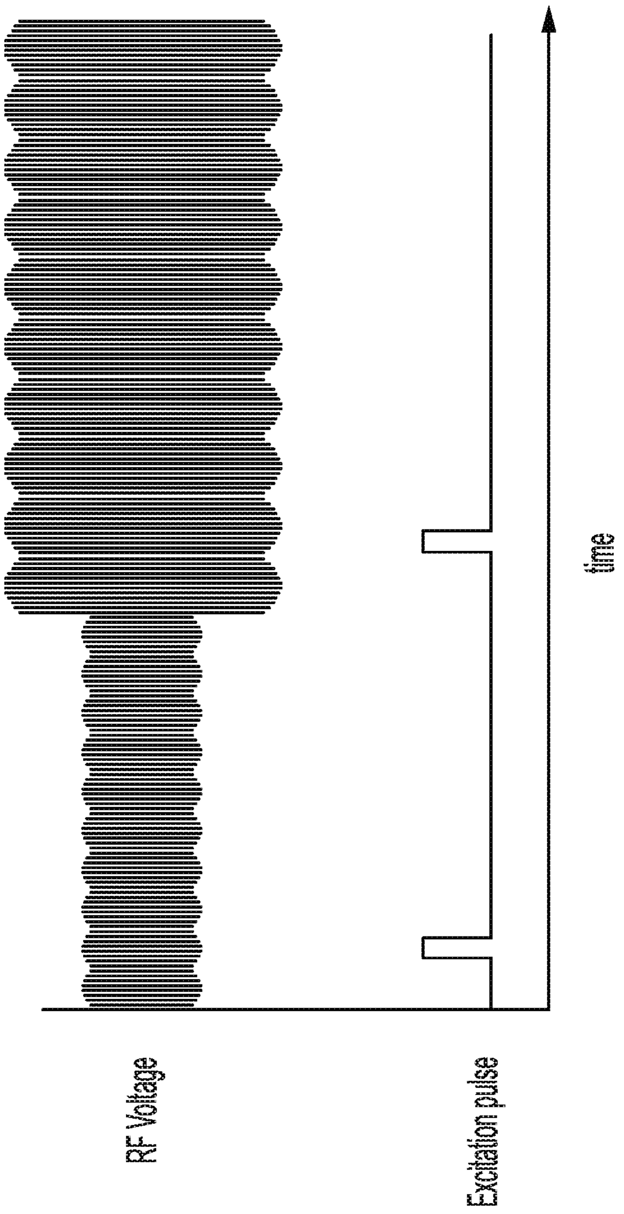
FIG. 13 is an example of a workflow according to an embodiment, which indicates the use of two different radial confinement conditions achieved by adjusting the amplitude of an RF voltage applied to at least one rod of a multipole FT mass analyzer.

The controller 1010 (See, FIG. 2A) can also be implemented in hardware, software and/or firmware using known techniques in the art informed by the present teachings. For example, in one example of implementation of the controller 1010, similar to the implementation of the analyzer 1200 depicted in FIG. 4A, the controller can include a processor, a random access memory (RAM), a permanent memory, and a communications module as well as a communications bus that allows communication between the processor and the other components of the controller. In some embodiments, instructions for operating the FT mass analyzer according to the present teachings can be stored in the permanent memory and can be transferred from the permanent memory to the RAM during runtime for execution. By way of example, the instructions stored in the permanent memory can implement a desired workflow, such as that depicted in FIG. 13. More specifically, FIG. 13 shows that the amplitude of the RF voltage can be adjusted to generate two different radial confinement conditions for the ions. FIG. 13 also shows the application of excitation pulses for causing radial oscillations of the ions, which can be employed for mass-dependent extraction of ions from the FT mass analyzer.

The following examples are provided for further elucidation of various aspects of the present teachings, and are not intended to necessarily provide the optimal ways of practicing the present teachings or the optimal results that can be obtained.

Example 1

Figure 7:
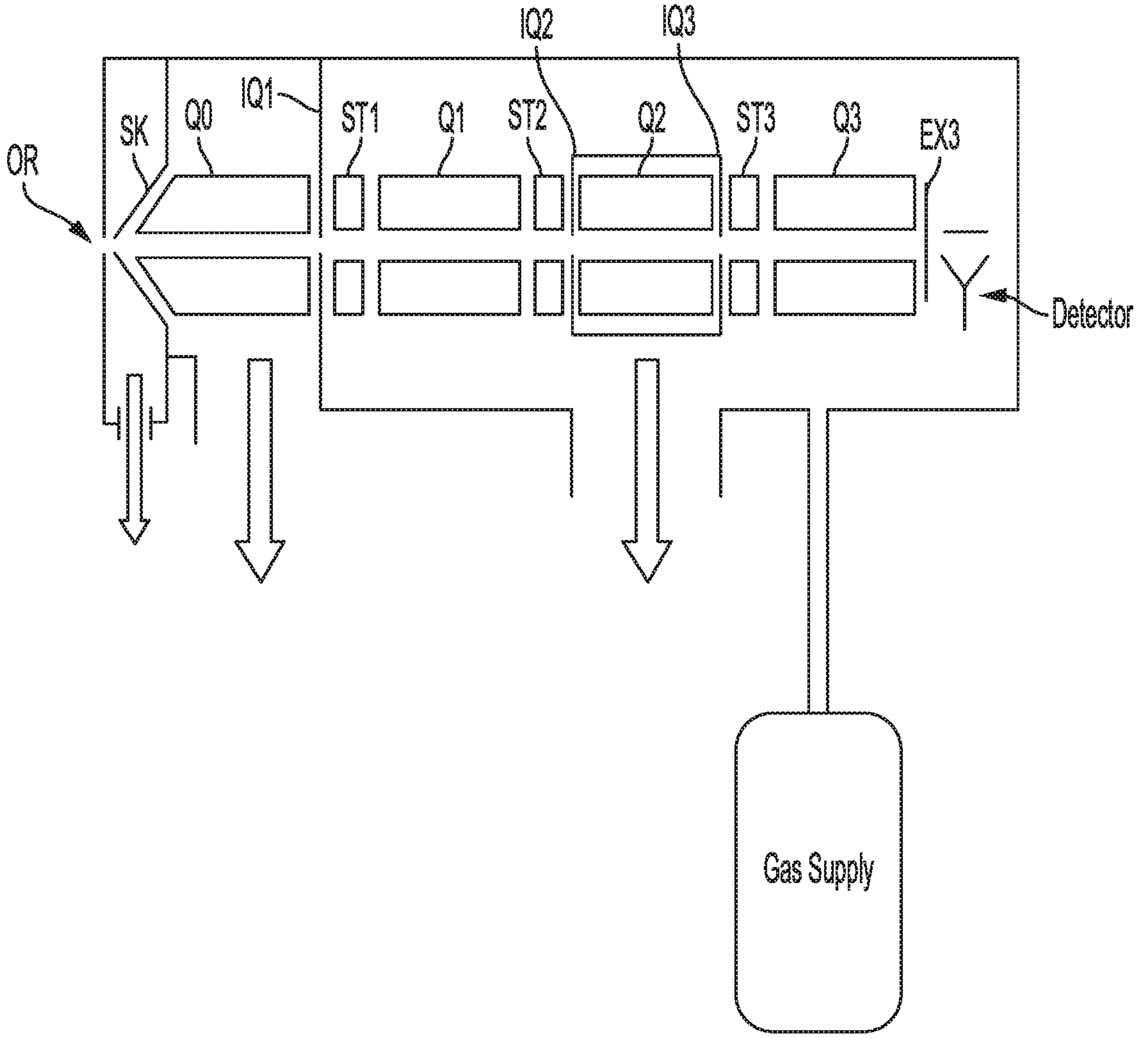
FIG. 7 is a schematic of an apparatus used to acquire illustrative data.

An apparatus based on a mass spectrometer marketed by Sciex under the designation 4000QTRAP, similar to the mass spectrometer depicted in FIG. 7, having four quadrupole rod sets (i.e., Q0, Q1, Q2, and Q3), each of which was powered by an independent, directly addressable, power supply was employed to generate the data discussed herein. The Q3 quadrupole was configured to act as the FT mass analyzer. Ions were mass selected (or not) by Q1 and thermalized in Q2, which was held at about 10 mTorr of nitrogen. The excitation pulse was broadband and had a nominal pulse width of 1-2 microseconds and a peak-to-peak amplitude of 25 V. It was applied in a dipolar fashion to a pair of rods of the FT mass analyzer. The time-resolved ion signal was frequency analyzed and converted into m/z units. Data acquisition rates were limited to about 75 Hz, though the instrument can be configured to allow higher data acquisition rates, e.g., 1 kHz. The data discussed below was the result of 1200 scan averages.

Figure 8A:
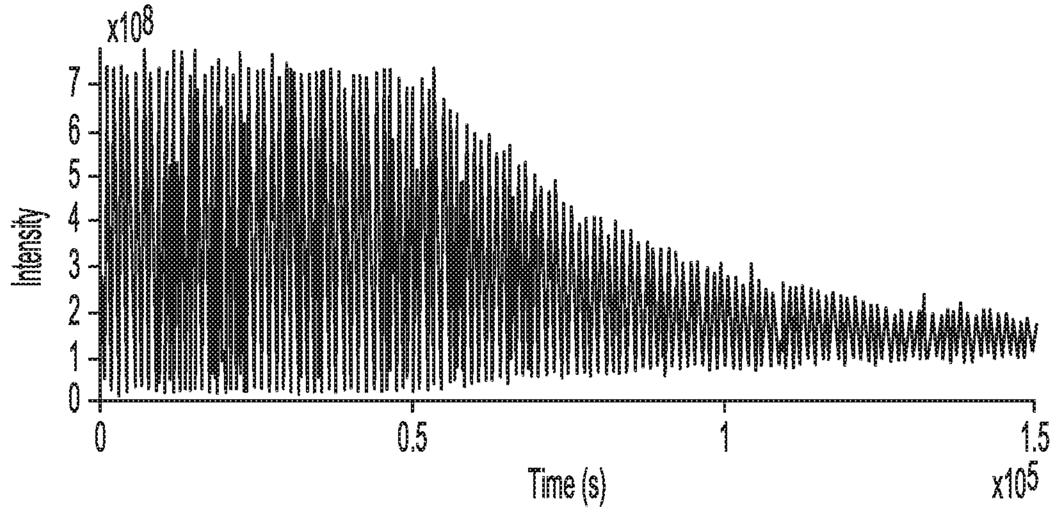
FIG. 8A shows a time-resolved ion signal corresponding to reserpine protonated molecular ion at m/z 609, which was acquired via an FT mass spectrometer.
Figure 8B:
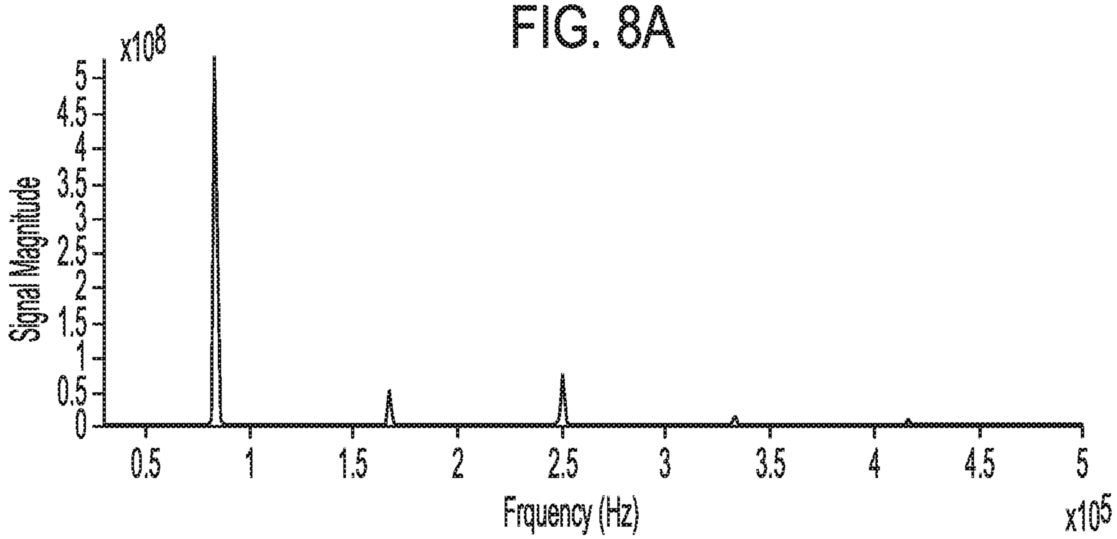
FIG. 8B depicts the corresponding frequency spectrum associated with the time-resolved ion signal depicted in FIG. 8A.
Figure 8C:
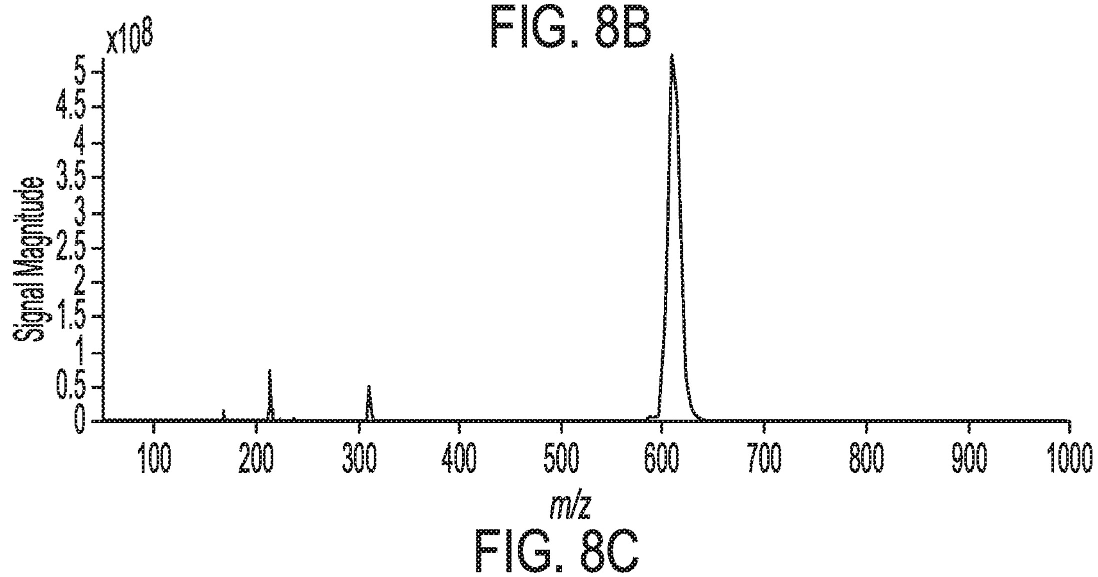
FIG. 8C shows the resultant mass spectrum obtained via analysis of the frequency spectrum.

FIG. 8A shows the time-resolved ion signal corresponding to reserpine protonated molecular ion at m/z 609. FIG. 8B depicts the corresponding frequency spectrum, and FIG. 8C shows the resultant mass spectrum obtained via analysis of the frequency spectrum. In this case, the analysis of the resultant mass spectrum is not complicated as the sample included a single component.

Figure 9A:
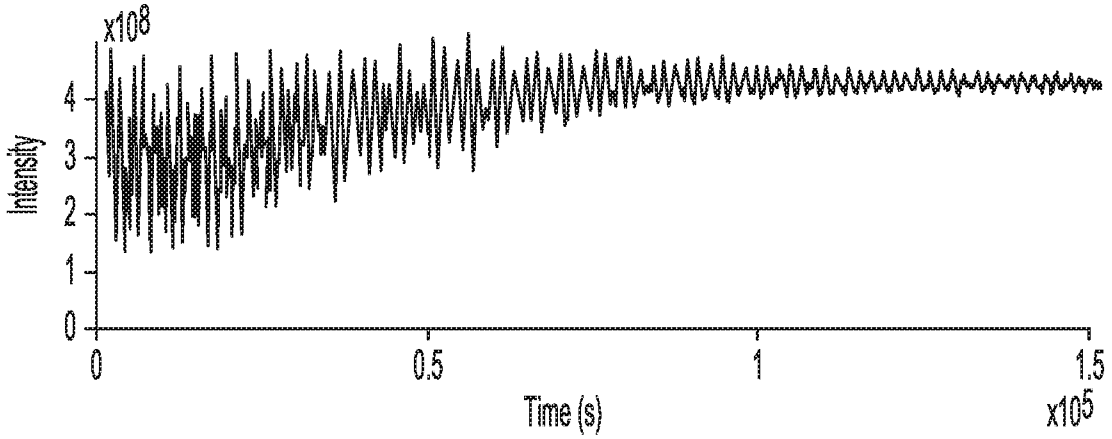
FIGS. 9A, 9B, and 9C depict, respectively, time-resolved signal, corresponding frequency spectrum and the associated mass spectrum for X500R positive ion calibration mixture.
Figure 9B:
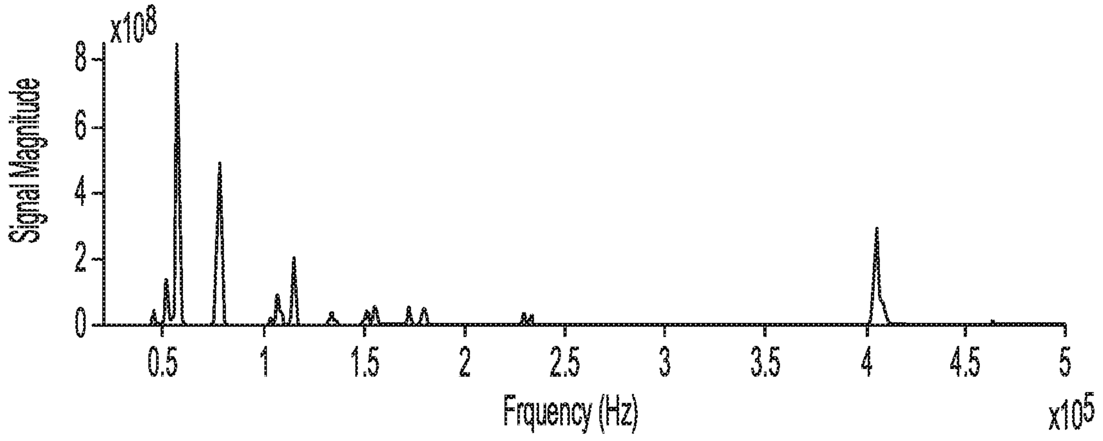
Figure 9C:
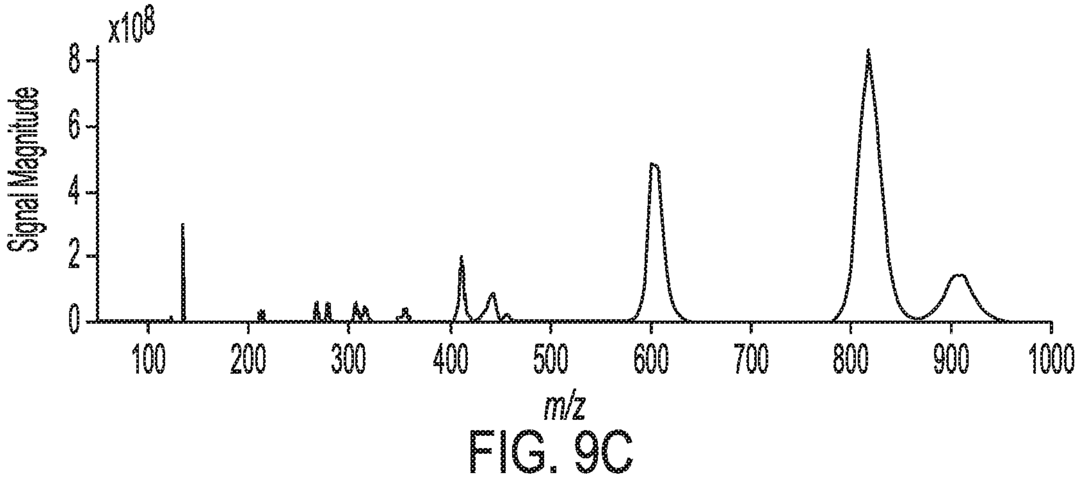

However, for certain samples containing mixtures of various components, the analysis of the resultant mass spectrum can be challenging. For example, FIGS. 9A, 9B, and 9C depict, respectively, time-resolved signal, corresponding frequency spectrum and the associated mass spectrum for X500R positive ion calibration mixture. In this case, many of the mass peaks corresponding to m/z values in the range of 200 to 500 are due to harmonics of the higher m/z analytes, particularly the mass peaks within the range of 600 and 829.

As discussed above, the spurious mass peaks due to higher harmonics of the mass peaks associated with analytes can be identified by acquiring two sets of mass data obtained under differing radial confinement conditions, e.g., acquired under different quadrupole RF and/or quadrupole DC values. Once such spectra are appropriately mass calibrated, the analyte peaks will overlap in m/z space while the spurious peaks due to higher harmonics are displaced. As discussed above, such displacement of the spurious peaks allows their identification and removal so as to generate a corrected mass spectrum, which can be more readily deciphered.

Figure 10:
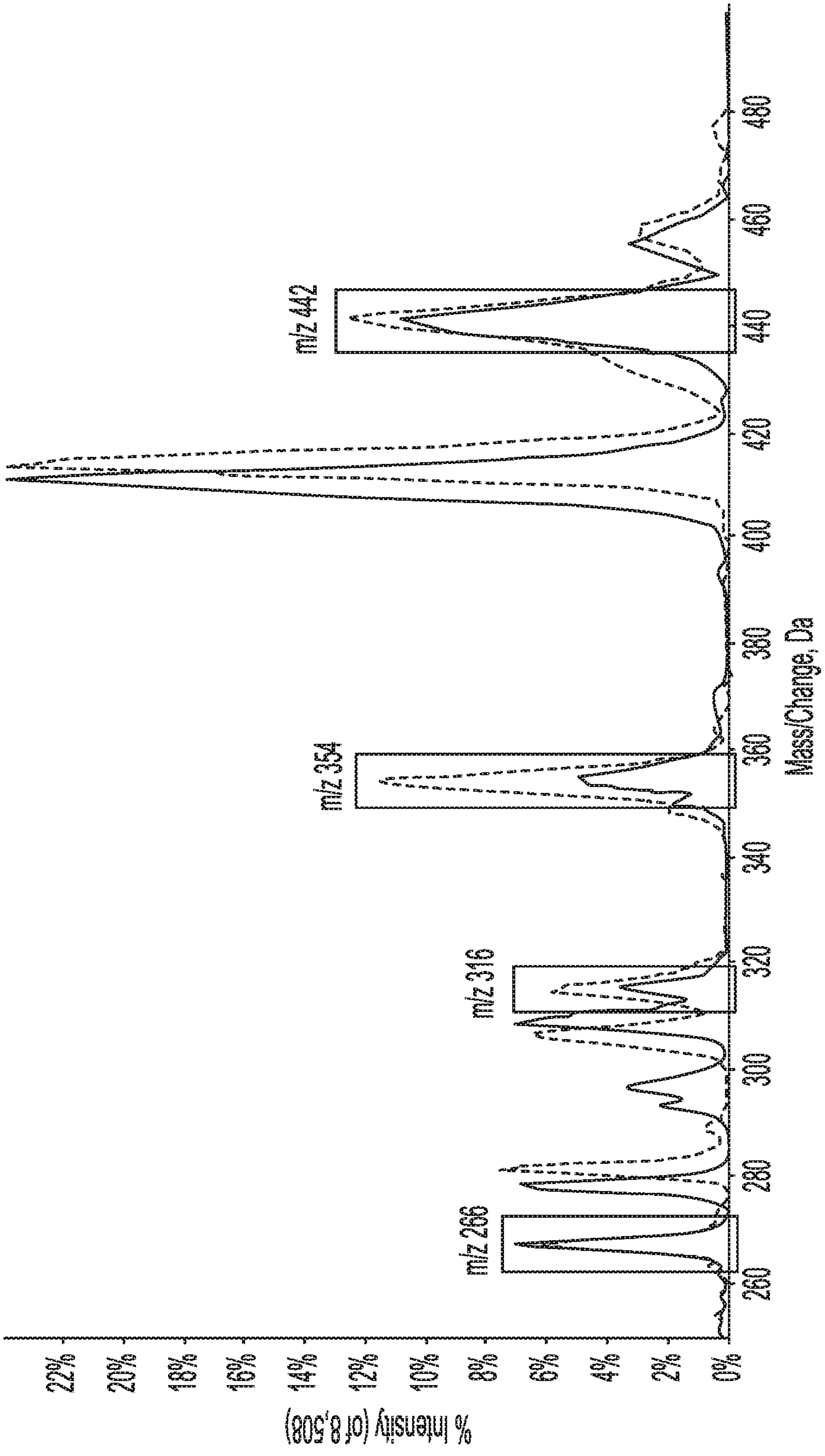
FIG. 10 shows an expanded region of an overlay of two different quadrupole FT mass spectra of X500R positive ion calibration mixture obtained with $V_{RF}$ values of 307 $V_{0\text{-}p}$ (solid line) and 351 $V_{0\text{-}p}$ (dashed line) with quadrupole DC=0 $V_{0\text{-}p}$.
Figure 11:
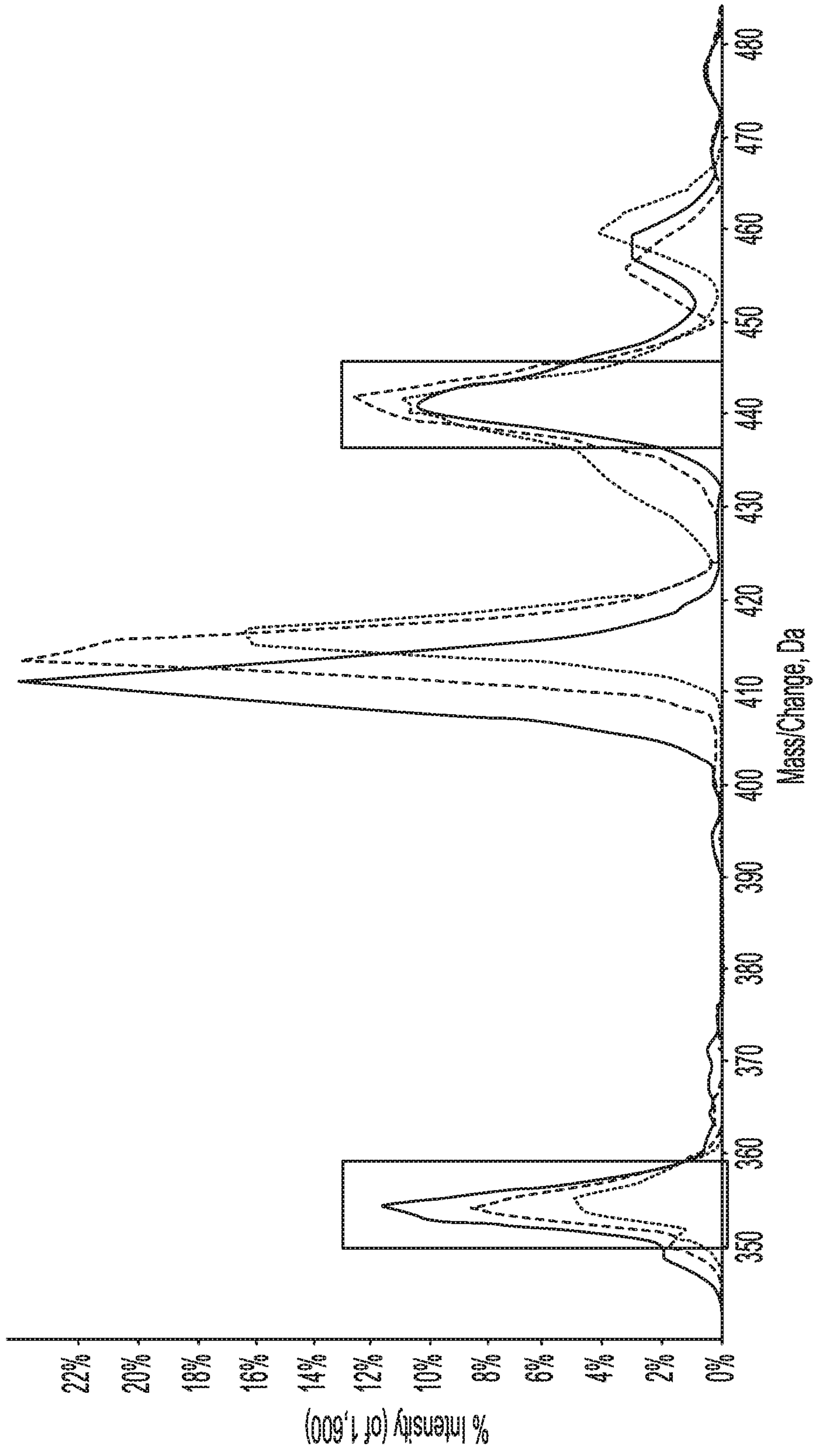
FIG. 11 shows another mass spectrum of X500R positive ion calibration mixture obtained at a different $V_{RF}$.

For example, FIG. 10 shows an expanded region of an overlay of two different quadrupole FT mass spectra of X500R positive ion calibration mixture obtained with $V_{RF}$ values of 307 $V_{0\text{-}p}$ (solid line) and 351 $V_{0\text{-}p}$ (dashed line) with quadrupole DC=0 $V_{0\text{-}p}$. The frequency of the applied RF voltage was 1.3217 MHz. The mass peaks at m/z ratios of 266, 316, 354 and 442 show an overlap between the two spectra.

Figure 12:
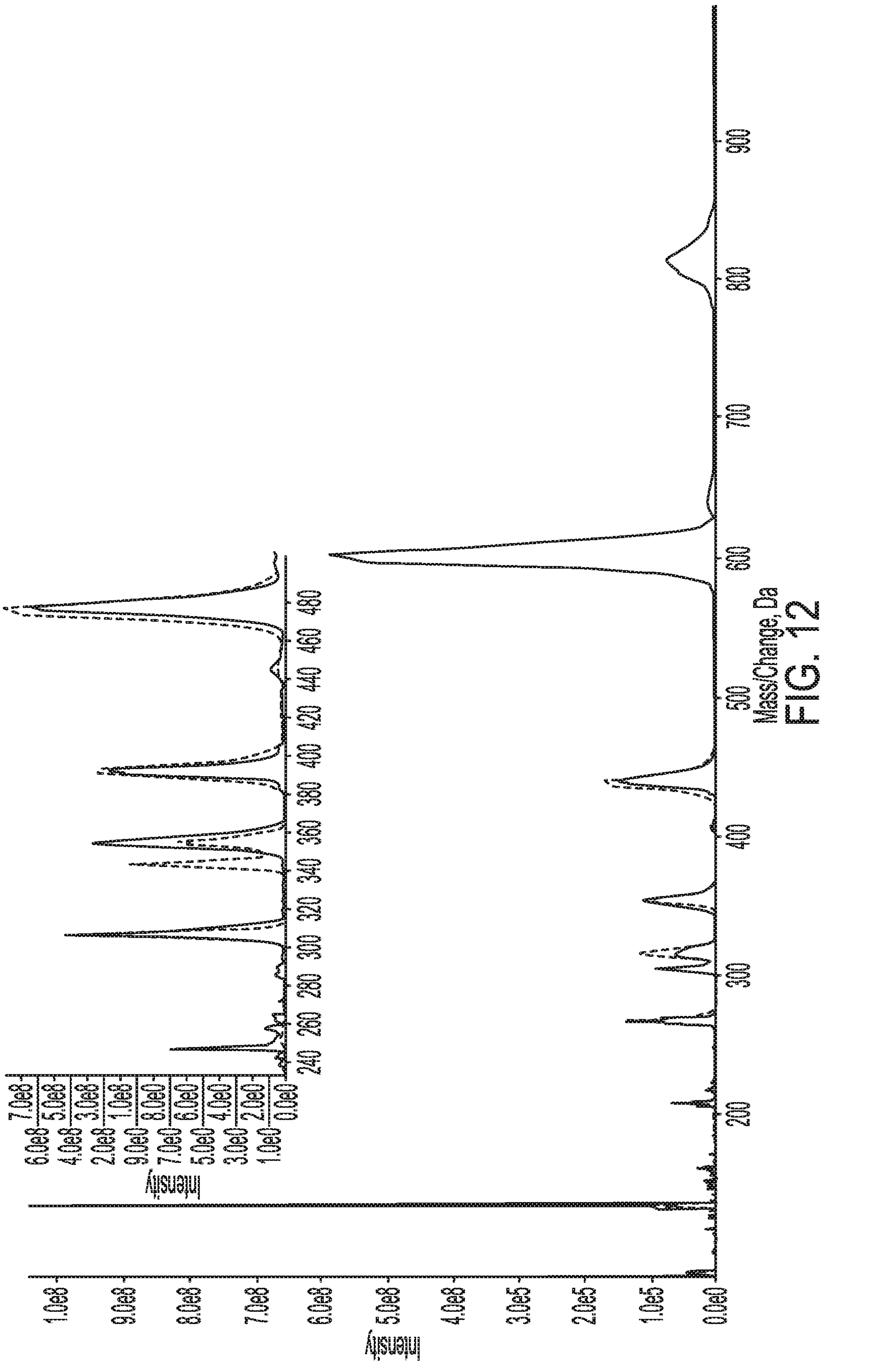
FIG. 12 shows the overlay of two different quadrupole FT mass spectra of X500R positive ion calibration mixture obtained with $V_{RF}$ values of 219 $V_{0\text{-}p}$ (solid line) and 274 $V_{0\text{-}p}$ (dashed line), with quadrupole DC=0 volt.

An inspection of the region around m/z of 458 suggests that there might be another analyte peak in this region. However, an additional measurement at a different $V_{RF}$ confirmed that this is an artefact caused by poor overlap in this region, as depicted in FIG. 12.

Example 2

As discussed above, another technique for disentangling spurious mass peaks from analyte peaks is to mass filter the ions passing through the RF quadrupole to eliminate those ions that contribute to spurious higher harmonics.

Such filtering of certain higher m/z ions can be achieved at least in the following two ways: (1) an upstream mass filter can be employed to reduce, or eliminate, ions that contribute to higher harmonics that may interfere with analyte mass peaks; (2) the value of $V_{RF}$ can be lowered so as to reduce (or eliminate) the contribution of higher m/z ions to the mass spectrum, e.g., $V_{RF}$ can be selected to be less than about 200 volts.

FIG. 12 shows an example of the latter approach, where the applied RF voltage has been reduced to the point that no contribution from any analyte mass above m/z of 500 is discernible in the resultant mass spectrum. More specifically, FIG. 12 shows the overlay of two different quadrupole FT mass spectra obtained with $V_{RF}$ values of 219 $V_{0\text{-}p}$ (solid line) and 274 $V_{0\text{-}p}$ (dashed line), with quadrupole DC=0 volt. The RF frequency was set at 1.3217 MHz. There was no transmission of ions above m/z of about 500 with the $V_{RF}$ set at 219 $V_{0\text{-}p}$. The inset shows the m/z region extending from 200 to 460 with only a few mass peaks due to the higher harmonics associated with higher m/z mass peaks at the $V_{RF}$ of 274 volts.

Those having ordinary skill in the art will appreciate that various changes can be made to the above embodiments without departing from the scope of the invention.

What is claimed is:

1. A method of performing mass spectrometry, comprising:

using a Fourier transform mass analyzer, which extends from an inlet port to an outlet port, to acquire a first mass spectrum of a first plurality of ions generated by ionizing a sample, wherein said first plurality of ions are radially confined within said mass analyzer under a first radial confinement condition, using said Fourier transform mass analyzer to acquire a second mass spectrum of a second plurality of ions generated by ionizing said sample, where said second plurality of ions are radially confined within said mass analyzer using a second radial confinement condition, and comparing said first and second mass spectra to identify spurious mass signals.

2. The method of claim 1, wherein said spurious mass signals correspond to spurious harmonics of mass signals of a subset of at least one of said first and second ions.

3. The method of claim 1, further comprising removing said spurious mass signals from at least one of said first and second mass spectrum to generate a corrected mass spectrum.

4. The method of claim 1, wherein said mass analyzer comprises a multipole mass analyzer.

5. The method of claim 4, wherein said first radial confinement condition is achieved via application of a first RF voltage to at least one rod of said multipole mass analyzer and said second radial confinement condition is achieved via application of a second RF voltage to at least one rod of said multipole mass analyzer, wherein said second RF voltage is different than said first RF voltage.

6. The method of claim 5, wherein said RF voltage has a frequency in a range of about 50 kHz to about 2 MHz.

7. The method of claim 5, wherein said RF voltage has a peak-to-peak amplitude in a range of about 10 volts to about 700 volts.

8. The method of claim 2, wherein positions of mass peaks and the spurious harmonic mass signals in any of said first and second mass spectrum exhibit different relationships relative to a change in a radial confinement condition.

9. The method of claim 4, wherein said multipole mass analyzer comprises four rods arranged in a quadrupole configuration.

10. The method of claim 1, wherein said step of using the Fourier transform mass analyzer to acquire any of said first and second mass spectrum comprises:

introducing any of said first and second plurality of ions into the mass analyzer, radially confining said ions using said first radial confinement condition, radially exciting at least a portion of said ions via an excitation signal to cause radial oscillations of said ions such that interaction of said radially excited ions with fringing fields in vicinity of said outlet port of the mass analyzer converts said radial oscillations into axial oscillations, detecting at least a portion of said axially oscillating ions, and generating a mass spectrum of said detected ions.

11. A method of performing mass spectrometry, comprising:

introducing a plurality of ions generated by ionizing a sample into a Fourier transform mass analyzer, radially confining said ions using at least a first radial confinement parameter, applying an ion excitation signal to radially excite at least a portion of said ions to cause said ions to exhibit radial oscillations at secular frequencies thereof, wherein said radially excited ions interact with fringing fields in vicinity of said exit port such that said radial oscillations are converted into axial oscillations, detecting at least a portion of the axially oscillating ions exiting the mass analyzer, determining a mass spectrum of said detected ions, modifying said at least first radial confinement parameter to obtain a second radial confinement parameter, introducing a second plurality of ions generated by ionizing said sample into the Fourier transform mass analyzer, radially confining said second plurality of ions using said second radial confinement parameter, applying an ion excitation signal to radially excite at least a portion of said second plurality of ions so as to cause said second plurality of ions to oscillate radially at secular frequencies thereof, wherein said radially oscillating ions interaction with the fringing fields in the vicinity of said exit port such that the radial oscillations are converted into axial oscillations, detecting at least a portion of the axially oscillating ions exiting the mass analyzer, determining a second mass spectrum corresponding to said detected axially oscillating ions, comparing said first and second mass spectra to identify spurious mass signals.

12. The method of claim 11, wherein said spurious mass signals correspond to spurious harmonics of mass signals associated with a subset of at least one of said first and second ions.

13. The method of claim 11, further comprising removing said spurious mass signals from any of said first and second mass spectrum to generate a corrected mass spectrum.

14. A method of performing mass spectrometry, comprising:

generating a plurality of ions exhibiting a distribution of m/z ratios, introducing said ions into a mass filter to remove ions having m/z ratios above or below a threshold m/z ratio, introducing the remaining ions into a Fourier transform (FT) mass analyzer comprising a plurality of rods arranged in a multipole configuration, said plurality of rods comprising an input port for receiving ions and an output port through ions can exit the mass analyzer, applying at least one RF voltage to at least one of said rods so as to generate an RF field for radial confinement of the ions as they pass through the multipole rod set, exciting radial oscillations of at least a portion of ions in said FT mass analyzer at secular frequencies thereof such that fringing fields in proximity of the output end of said plurality of rods convert said radial oscillations of at least a portion of said excited ions into axial oscillations as said excited ions exit the multipole rod set, and detecting at least a portion of said axially oscillating ions exiting the multipole rod set to generate a time-varying signal, obtaining a Fourier transform of said time-varying signal to generate a mass spectrum of said remaining ions, wherein said threshold for removing ions is selected so as to reduce occurrence of spurious harmonics of mass signals or to facilitate detection of said spurious harmonics in the mass spectrum.

15. The method of claim 14, wherein said threshold corresponds to an m/z ratio of about 500.

16. The method of claim 14, wherein said multipole configuration comprises a quadrupole configuration.

17. The method of claim 14, wherein said step of exciting the radial oscillations comprises applying a voltage pulse across at least two of said rods.

18. The method of claim 17, wherein said voltage pulse has a duration in a range of about 1 microsecond to about 5 microseconds.

19. The method of claim 18, wherein said voltage pulse has an amplitude in a range of about 10 volts to about 60 volts.

20. The method of claim 14, wherein said RF voltage has a frequency in a range of about 50 kHz to about 2 MHz.

* * * * *